United States Patent
Cao et al.

(10) Patent No.: US 10,159,043 B1
(45) Date of Patent: Dec. 18, 2018

(54) TRAINING SEQUENCES IN WIRELESS COMMUNICATION SYSTEMS

(71) Applicant: Marvell International Ltd., Hamilton (BM)

(72) Inventors: Rui Cao, Fremont, CA (US); Yakun Sun, San Jose, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 64 days.

(21) Appl. No.: 15/221,438

(22) Filed: Jul. 27, 2016

Related U.S. Application Data (60) Provisional application No. 62/240,241, filed on Oct. 12, 2015, provisional application No. 62/197,856, filed on Jul. 28, 2015.

(51) Int. Cl.
| | |
|---|---|
| *H04L 27/26* | (2006.01) |
| *H04W 52/02* | (2009.01) |
| *H04L 5/00* | (2006.01) |
| *H04W 84/12* | (2009.01) |

(52) U.S. Cl.
CPC ....... *H04W 52/0229* (2013.01); *H04L 5/0007* (2013.01); *H04L 27/262* (2013.01); *H04W 84/12* (2013.01)

(58) Field of Classification Search
CPC ................................ H04L 27/26; H04W 72/04
See application file for complete search history.

(56) References Cited

U.S. PATENT DOCUMENTS

| | | | |
|---|---|---|---|
| 2016/0234049 A1* | 8/2016 | Azizi | H04W 4/008 |
| 2016/0286551 A1* | 9/2016 | Lee | H04L 27/26 |

OTHER PUBLICATIONS

IEEE P802.11ac/D2.1, "Draft Standard for Information Technology—Telecommunications and information exchange between systems—Local and Metropolitan area networks—Specific requirements; Part 11: Wireless LAN Medium Access Control (MAC) and Physical layer (PHY) specifications; Amendment 4: Enhancements for Very High Throughput for Operation in Bands below 6 GHz", IEEE Standards Activities Department, Mar. 2012, 363 pages.

Zhang et al., "Compressed Orthogonal Frequency Division Multiplexing (OFDM) Symbols in a Wireless Communication System", 2015, 106 pages.

* cited by examiner

*Primary Examiner* — Lakeram Jangbahadur (57) ABSTRACT

The present disclosure includes systems and techniques relating to training sequences used in wireless communication systems. In some implementations, a transmission mode of a transmitting device is determined for transmitting a long training field (LTF) sequence for High Efficiency (HE) wireless local area network (WLAN) communication. Based on the transmission mode, candidate training sequences for the LTF sequence are constructed. Each candidate sequence includes a first number of base sequences and a second number of floating sequences, wherein the base sequences reuse an LTF sequence for Very High Throughput (VHT) WLAN communication. The candidate training sequences are constructed by varying values and locations of the floating sequences. A target training sequence is selected that has a desired peak-to-average power ratio (PAPR) value. The target training sequence is assigned to the transmitting device for transmitting the target training sequence in the LTF for the HE WLAN communication.

21 Claims, 7 Drawing Sheets

TRAINING SEQUENCES IN WIRELESS COMMUNICATION SYSTEMS

CROSS REFERENCE TO RELATED APPLICATIONS

This application claims the benefit of the priority of U.S. Provisional Application Ser. No. 62/197,856, filed on Jul. 28, 2015 and entitled "HE-LTF Sequence Design" and U.S. Provisional Application Ser. No. 62/240,241, filed on Oct. 12, 2015 and entitled "HE-LTF Sequence Design," which are hereby incorporated by reference in its entirety.

BACKGROUND

The present disclosure describes systems and techniques relating to training sequences used in a wireless communication system.

When operating in an infrastructure mode, wireless local area networks (WLANs, e.g., WiFi networks) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Further standards promise to provide even greater throughputs, such as throughputs in the tens of Gbps range.

SUMMARY

The present disclosure includes systems and techniques relating to training sequences used in a wireless communication system. According to an aspect of the described systems and techniques, a device includes a processing unit and a transmitter. The processing unit is configured to identify a transmission mode of the device for transmitting a long training field (LTF) sequence for High Efficiency (HE) wireless local area network (WLAN) communication; and obtain a target training sequence for the LTF sequence for the HE WLAN communication, the target sequence including a first number of base sequences and a second number of floating sequences, the first number of base sequences and the second number of floating sequences have been determined based on the transmission mode, the base sequences reusing an LTF sequence for Very High Throughput (VHT) WLAN communication, and values and locations of the floating sequences have been determined such that the target sequence has a desired peak-to-average power ratio (PAPR) value. The transmitter is configured to transmit the target training sequence in the LTF for the HE WLAN communication according to the transmission mode.

According to another aspect of the described systems and techniques, a method includes determining a transmission mode of a transmitting device for transmitting a long training field (LTF) sequence for High Efficiency (HE) wireless local area network (WLAN) communication; based on the transmission mode, constructing a plurality of candidate training sequences for the LTF sequence for the HE WLAN communication, wherein each candidate sequence includes a first number of base sequences and a second number of floating sequences, wherein the base sequences reuse an LTF sequence for Very High Throughput (VHT) WLAN communication, and wherein constructing the plurality of candidate training sequences includes constructing the plurality of candidate training sequences by varying values and locations of the second number of floating sequences; selecting a target training sequence, from the plurality of candidate training sequences for the LTF sequence for the HE WLAN communication, that has a desired peak-to-average power ratio (PAPR) value; and assigning the target training sequence to the transmitting device for transmitting the target training sequence in the LTF for the HE WLAN communication.

According to another aspect of the described systems and techniques, a non-transitory computer-readable medium embodying a program operable to cause data processing apparatus to perform operations including determining a transmission mode of a transmitting device for transmitting a long training field (LTF) sequence for High Efficiency (HE) wireless local area network (WLAN) communication; based on the transmission mode, constructing a plurality of candidate training sequences for the LTF sequence for the HE WLAN communication, wherein each candidate sequence includes a first number of base sequences and a second number of floating sequences, wherein the base sequences reuse an LTF sequence for Very High Throughput (VHT) WLAN communication, and wherein constructing the plurality of candidate training sequences includes constructing the plurality of candidate training sequences by varying values and locations of the second number of floating sequences; selecting a target training sequence, from the plurality of candidate training sequences for the LTF sequence for the HE WLAN communication, that has a desired peak-to-average power ratio (PAPR) value, and assigning the target training sequence to the transmitting device for transmitting the target training sequence in the LTF for the HE WLAN communication.

These and other implementations may include one or more of the following features. In some implementations, determining a transmission mode includes determining one or more of a transmission bandwidth, a transmission direction, a tone spacing, a single user (SU) multiple input multiple output (MIMO) mode, a multiple user (MU) MIMO mode, or an orthogonal frequency division multiple access (OFDMA) mode.

In some implementations, the first number of base sequences and the second number of floating sequences are determined based on the transmission bandwidth and the tone spacing.

In some implementations, it is determined that the transmission mode is an OFDMA mode. In response to determining that the transmission mode is an OFDMA mode, the target training sequence is masked by muting specified tones of the target training sequence.

In some implementations, the transmitting device transmits the target training sequence in the LTF for the HE WLAN communication.

In some implementations, the base sequences reuse an LTF sequence for VHT WLAN communication with a transmission bandwidth of 20 MHz, a left sequence of the LTF sequence for VHT WLAN communication with a transmission bandwidth of 20 MHz, or a right sequence of the LTF sequence for VHT WLAN communication with a transmission bandwidth of 20 MHz.

In some implementations, the target sequence has been selected from a plurality of candidate training sequences for the LTF sequence for the HE WLAN communication based on the transmission mode, the plurality of candidate training sequences including varied values and locations of the floating sequences.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The disclosed technologies can result in one or more of the following potential advantages. The described systems and techniques can provide flexibility in training sequence designs and significant complexity reduction in searching for the optimal or suboptimal training sequence for a specified transmission mode.

Details of one or more implementations are set forth in the accompanying drawings and the description below. Other features and advantages may be apparent from the description and drawings, and from the claims.

DETAILED DESCRIPTION

The systems and techniques described herein can be implemented as one or more devices, such as one or more integrated circuit (IC) devices, in a communication device (e.g., a wireless communication device, a wireline communication device, an electronic data storage device, a channel medium access access/control device), or other device configured to implement such systems and techniques. For example, the systems and techniques disclosed can be implemented in a wireless local area network (WLAN) transceiver device (e.g., a WLAN chipset) suitable for use in an orthogonal frequency division multiplexing (OFDM) multiple input multiple output (MIMO) system.

High Efficiency (HE) WiFi or High Efficiency WLAN (HEW), such as Institute of Electrical and Electronics Engineers (IEEE) 802.11ax, has been proposed and under development by the IEEE 802.11 working group to consider the improvement of spectrum efficiency to enhance the system throughput. Compared to legacy WLAN communication protocols (e.g., IEEE 802.11a, IEEE 802.11g, IEEE 802.11n, and IEEE 802.11ac), smaller tone spacing is adopted in IEEE 802.11ax for the next generation WLAN network to improve the transmission efficiency.

In some implementations, a WLAN or WiFi system (e.g., high density network IEEE 802.11ax, HEW system) can allow multiple users to access the communication channel based on orthogonal frequency-division multiple access (OFDMA). OFDMA is a multi-user version of OFDM digital modulation scheme. Multiple access can be achieved in OFDMA by assigning subsets of subcarriers or tones to individual users. This allows simultaneous transmission among several users. OFDMA has been considered as an effective technique to boost system throughput and network capacity.

In some implementations, a long training field (LTF) is used for WLAN for wide-band channel estimation, and potentially phase tracking. The LTF is a field of a physical layer (PHY) data unit transmitted by a transmitter (e.g., an access point (AP) or a client station) in a WLAN. The LTF can include a training sequence that is designed to facilitate channel estimation, phase tracking, etc. For example, the IEEE 802.11 ac Standard (also known as Very High Throughput (VHT)) has designed LTF sequences for all bandwidths (e.g., 20 MHz, 40 MHz, 80 MHz, and 160 MHz). Typically, the size of LTF and hence the length of the LTF sequence increases as the bandwidth increases. The LTF sequences used by IEEE 802.11 ac Standard are referred to as VHT-LTF sequences. The LTF sequences are designed to have good peak-to-average power ratio (PAPR) properties. In some implementations, the LTF sequences can be designed to have other desired properties (e.g., ideal autocorrelation or optimal cross correlation).

In general, the optimal LTF sequence of a certain size or length can be identified by exhaustive search. However, as the length of the sequence increases, exhaustive search for the best LTF sequences becomes impractical. As such, LTF sequences for large bandwidth (e.g., larger than 20 MHz) are constructed based on the optimal sequences for 20 MHz because of the large LTF size for large bandwidth systems.

In some implementations, a base sequence (e.g., the optimal sequence for 20 MHz legacy LTF) can be defined as below:

$$LTF_{-26:26}=[LTFleft;0;LTFright] \quad (1)$$

wherein:

$$LTFleft=[1; 1; -1; -1; 1; 1; -1; 1;-1; 1; 1; 1; 1;\\ 1; -1; -1; 1; 1; -1; 1; -1; 1; 1; 1; 1] \quad (2)$$

$$LTFright=[1; -1; -1; 1; 1; -1; 1; -1; 1; -1; -1; -1;\\ -1; -1; 1; 1; -1; -1; 1; -1; 1; -1; 1; 1; 1; 1] \quad (3).$$

The VHT-LTF sequence for the 20 MHz bandwidth can be:

$$20\ MHz\ VHTLTF=[1;1;LTFleft;0;LTFright;-1;-1] \quad (4).$$

The VHT-LTF sequence for the 40 MHz bandwidth can be:

$$40\ MHz\ VHTLTF=[LTFleft;1;LTFright;\ -1;-1;-1;\ 1;\\ 0;\ 0;\ 0;-1;1;\ 1;-1;LTFleft;1;LTFright;] \quad (5).$$

The VHT-LTF sequence for the 80 MHz bandwidth can be:

$$80\ MHz\ VHTLTF=[LTFleft;1;LTFright;-1;-1;-1;\ 1;\\ 1;-1;\ 1;-1;\ 1,\ 1;-1;\ LTFleft;\ 1;\ LTFright;1;-1;\\ 1;-1;\ 0;\ 0;\ 0;\ 1;-1;-1;\ 1;\ LTFleft;\ 1;\ LTFright;-\\ 1;-1;-1;\ 1;\ 1;-1;\ 1;-1;\ 1;\ 1;-1;\ LTFleft;\ 1;LT-\\ Fright] \quad (6).$$

In HEW systems, the HEW protocol may include an HE-LTF field in its PHY data unit, and the sequences for transmission in the HE-LTF can be referred to as HE-LTF sequences. In HEW systems, with smaller tone spacing and variable LTF compression, larger and variant tone planning may exist. The corresponding HE-LTF sequences may need to be redesigned. Moreover, the adoption of OFDMA into HEW allows various resource unit (RU) sizes to be used by a transmitter (e.g., a client station). In some instances, the various RU sizes need to be considered in designing the HE-LTF sequences.

In this disclosure, design strategies of HE-LTF sequences are proposed for various scenarios. In some implementations, the HE-LTF sequences can be designed by reusing VHT-LTF sequences. For different transmission modes, the HE-LTF sequence design has different challenges.

For example, for single user (SU) and multi-user (MU) MIMO, with ¼ tone spacing, the HE-LTF sequence length is roughly 4× longer than VHT-LTF; with ½ tone spacing, the HE-LTF sequence length is roughly 2× longer than VHT-LTF. The corresponding longer HE-LTF sequences should be designed in view of this.

For OFDMA, compared with SU/MUMIMO, some tones are left unpopulated as guard tones. In some implementations, the HE-LTF sequence can be designed based on SU/MUMIMO HE-LTF, with special handling of unpopulated tones.

Figure 1:
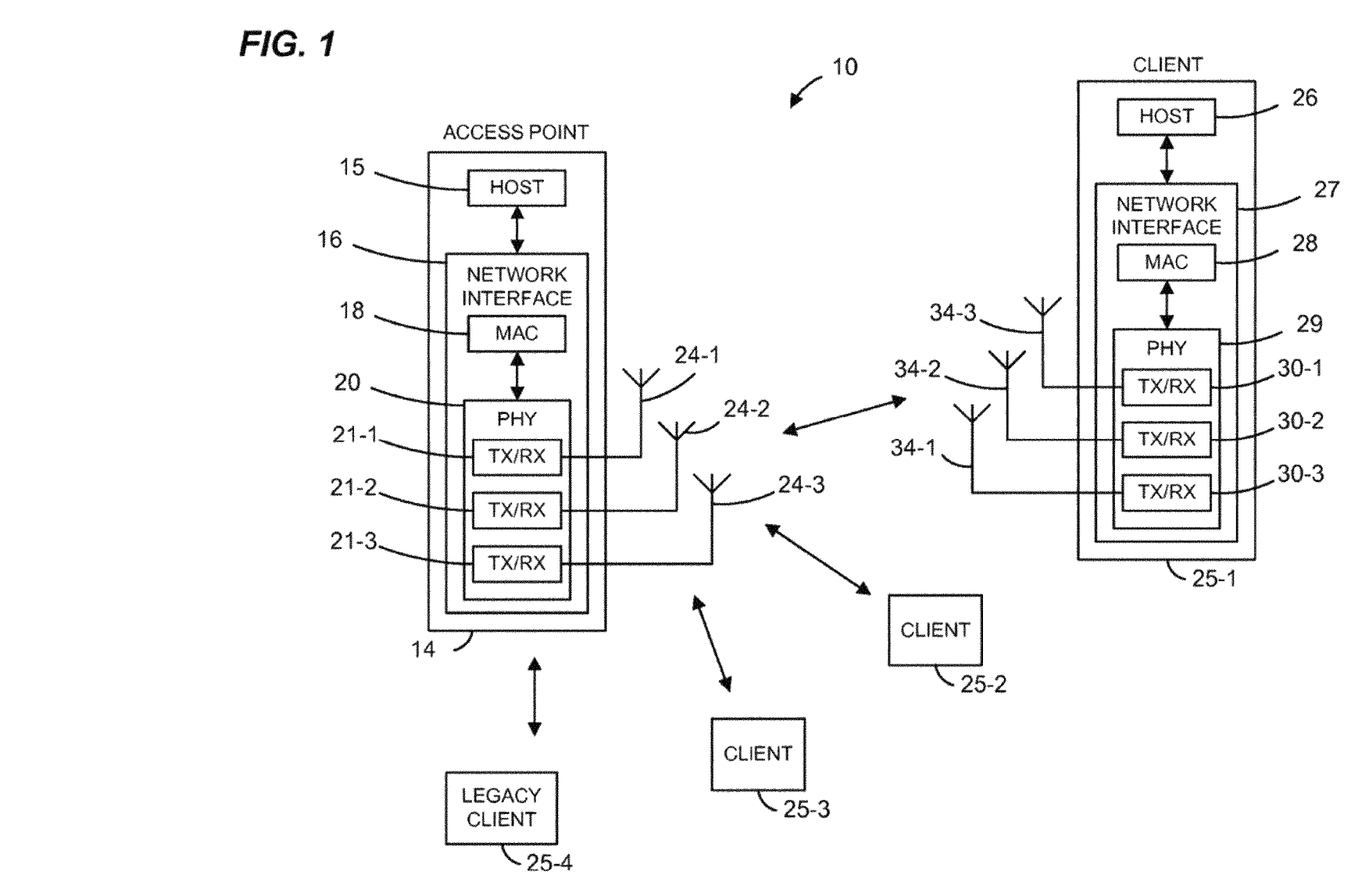
FIG. 1 is a block diagram showing an example of a communication system.

FIG. 1 is a block diagram showing an example of a communication system, such as a WLAN system 10. The WLAN system 10 includes an access point (AP) 14 and multiple clients 25-1, 25-2, 25-3 and 25-4 (collectively, clients 25). The AP 14 includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21-1, 21-2, 21-3 (collectively, transceivers 21), and the transceivers 21 are coupled to a plurality of antennas 24. Although three transceivers 21 and three antennas 24-1, 24-2, and 24-3 (collectively, antennas 24) are illustrated in FIG. 1, the AP 14 includes other suitable numbers (e.g., 1, 2, 4, 5, etc.) of transceivers 21 and antennas 24 in other embodiments. In some embodiments, the MAC processing unit 18 and the PHY processing unit 20 are configured to operate according to a first communication protocol (e.g., a HEW communication protocol such as IEEE 802.11ax). In some embodiments, the MAC processing unit 18 and the PHY processing unit 20 are also configured to operate according to a second communication protocol (e.g., IEEE 802.11ac). In further embodiments, the MAC processing unit 18 and the PHY processing unit 20 are additionally configured to operate according to the second communication protocol, a third communication protocol and/or a fourth communication protocol (e.g., the IEEE 802.11a and/or the IEEE 802.11n).

The WLAN 10 includes a plurality of client stations 25. The client stations 25 can include access terminals (AT), wireless stations (STAs), mobile stations (MS), or other devices. Although four client stations 25 are illustrated in FIG. 1, the WLAN 10 includes other suitable numbers (e.g., 1, 2, 3, 5, 6, etc.) of client stations 25 in various scenarios and embodiments. The client stations 25 (e.g., client station 25-1) can be configured to operate according to the first communication protocol (e.g., a HEW communication protocol). In some instances, a client station 25 can be configured to operate according to a legacy communication protocol (e.g., the second communication protocol, the third communication protocol, and/or the fourth communication protocol), and such a client station 25 be referred to, herein, as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30-1, 30-2, and 30-3 (collectively, transceivers 30), and the transceivers 30 are coupled to one or more antennas 34-1, 34-2, and 34-3 (collectively, antennas 34). Although three transceivers 30 and three antennas 34 are illustrated in FIG. 1, the client station 25-1 includes other suitable numbers (e.g., 1, 2, 4, and 5) of transceivers 30 and antennas 34 in other embodiments.

In some implementations, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 21 is/are configured to receive the data units via the antenna(s) 24. The PHY processing unit 20 of the AP 14 is configured to process received data units conforming to the first communication protocol and having formats described herein and to determine that such data units conform to the first communication protocol, according to various embodiments.

In some implementations, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

Figure 2A:
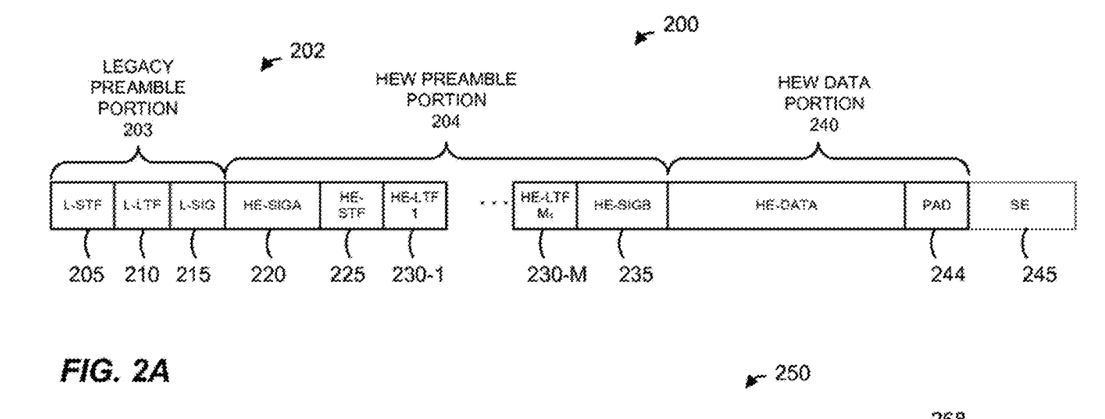
FIG. 2A is a diagram showing an example of a physical layer (PHY) data unit.

FIG. 2A is a diagram of a physical layer (PHY) data unit 200 that the AP 14 is configured to transmit to a client station (e.g., the client stations 25-1), for example, via orthogonal frequency domain multiplexing (OFDM) modulation, according to an embodiment. In an embodiment, the client station 25-1 is also configured to transmit the data unit 200 to the AP 14. The data unit 200 conforms to the HEW communication protocol and occupies a 20 MHz bandwidth. Data units similar to the data unit 200 occupy other suitable bandwidths such as 40 MHz, 80 MHz, 160 MHz, 320 MHz, 640 MHz, for example, or other suitable bandwidths, in other embodiments. The data unit 200 is suitable for "mixed mode" situations, i.e., when the WLAN 10 includes a client station (e.g., the legacy client station 24-4) that conforms to a legacy communication protocol, but not the first communication protocol. The data unit 200 is utilized in other situations as well, in some embodiments.

The data unit 200 includes a preamble 202, which, in turn, includes a legacy preamble portion 203 and a high efficiency (HE) preamble portion 204. The legacy preamble portion 202 includes a legacy short training field (L-STF) 205, an L-LTF 210, and a legacy signal field (L-SIG) 215. The HE preamble portion 204 includes one or more HE signal field(s) (HE-SIGA(s)) 220, a HE short training field (HE-STF) 225, M HE long training fields (HE-LTFs) 230-1, . . . , 230-M (collectively, HE-LTFs 230), where M is an integer, and an HE signal field B (HE-SIGB) 235. Each of the L-STF 205, the L-LTF 210, the L-SIG 215, the HE-SIGAs 220, the HE-STF 225, the M HE-LTFs 230, and the HE-SIGB 235 includes an integer number of OFDM symbols. For example, in an embodiment, the HE-SIGAs 220 includes two OFDM symbols, and the HE-SIGB field includes one OFDM symbol, in an embodiment. The L-SIG 215, the HE-SIGAs 220 and the HE-SIGB 235 generally carry formatting information for the data unit 200, in an embodiment. In some embodiments, the data unit 200 also includes a data portion 240. The data portion 240 includes a padding portion 244, in an embodiment. In an embodiment, the padding portion 244 includes only the last OFDM symbol of the data portion 240. In another embodiment, the padding portion 244 includes more than one OFDM symbol at the end of the of the data portion 240. In some embodiments and/or scenarios, the data portion 240 omits the padding portion 244.

In an embodiment, the data unit 200 further includes a signal extension (SE) field 245. In an embodiment, the SE field 245 provides buffer time for a receiving device (e.g., a client station 25 or the AP 14) to process the last OFDM symbol of the data portion 240 prior to providing an acknowledgement (ACK) or a block acknowledgement (BlkAck) signal to the transmitting device. In some embodiments, the data unit 200 omits the SE field 245.

In the embodiment of FIG. 2A, the data unit 200 includes one of each of the L-STF 205, the L-LTF 210, the L-SIG 215, and the HE-SIGA(s) 220. In other embodiments in which an OFDM data unit similar to the data unit 200 occupies a cumulative bandwidth other than 20 MHz, each of the L-STF 205, the L-LTF 210, the L-SIG 215, the HE-SIGA(s) 220 is repeated over a corresponding number of 20 MHz sub-bands of the whole bandwidth of the data unit, in an embodiment. For example, in an embodiment, the OFDM data unit occupies an 80 MHz bandwidth and, accordingly, includes four of each of the L-STF 205, the L-LTF 210, the L-SIG 215, the HE-SIGA(s) 220. In some embodiments, the modulation of different 20 MHz sub-bands signals is rotated by different angles. For example, in some embodiments, all OFDM tones within a first subband are rotated 0 degrees, all OFDM tones within a second subband are rotated 90 degrees, a third sub-band is rotated 180 degrees, and a fourth sub-band is rotated 270 degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIGB and the HE data portion occupy the corresponding whole bandwidth of the data unit.

In an embodiment, the data unit 200 is a single user (SU) data unit transmitted to (or by) a single client station 25. In another embodiment, the data unit 200 is a multi-user (MU) data unit in independent data streams that are simultaneously transmitted to (or by) multiple client stations 25, where each of the data streams is transmitted using one or more spatial streams within the data unit 200. In some implementations, a client station 25 may use the channel estimation from the HE-LTF 230 to decode the HE-SIGB field 235.

Figure 2B:
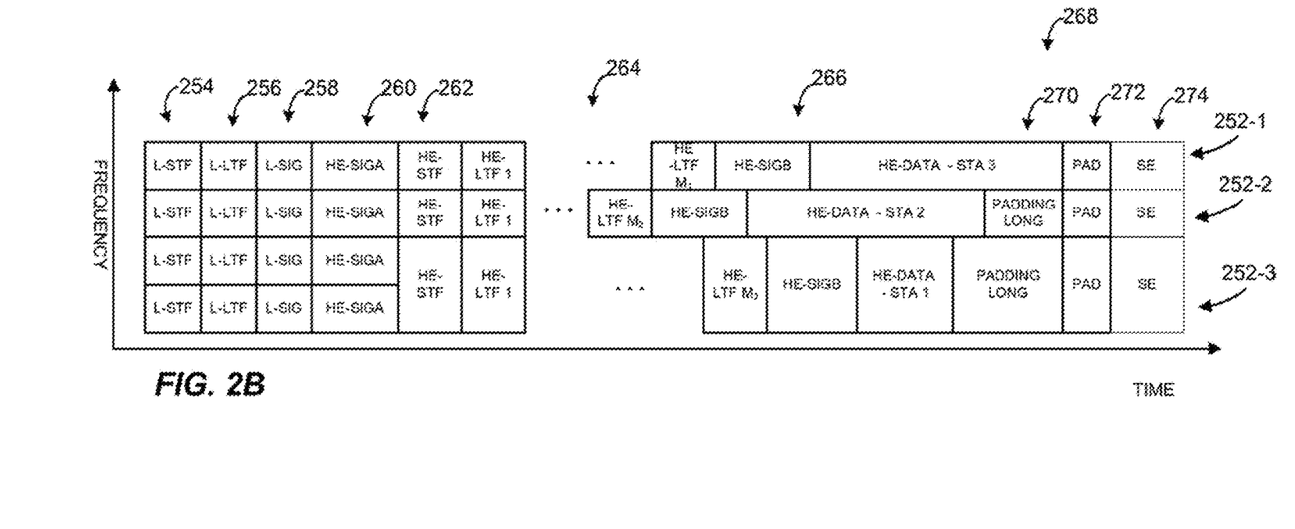
FIG. 2B is a diagram showing another example of a PHY data unit.

FIG. 2B is a diagram of an example of an orthogonal frequency division multiple access (OFDMA) data unit 250, according to an embodiment. The OFDMA data unit 250 includes a plurality of OFDM data unit 252-1, 252-2, and 252-3. In an embodiment, each data unit 252-1, 252-2, and 252-3 is the same as or similar to the data unit 200 of FIG. 2A. In an embodiment, the AP 14 transmits the OFDM data units 252-1, 252-2, 252-3 to different client stations 25 via respective OFDM sub-channels within the OFDMA data unit 250. In another embodiment, different client stations 25 transmit respective OFDM data units 252-1, 252-2, 252-3 to the AP 14 in respective OFDM sub-channels within the OFDMA data unit 250. In this embodiment, The AP 14 receives the OFDM data units 252-1, 252-2, 252-3 from the client stations 25 via respective OFDM sub-channels within the OFDMA data unit 250, in this embodiment.

Each of the OFDM data units 252-1, 252-2, and 252-3 conforms to a communication protocol that supports OFDMA transmission, such as the HEW communication protocol, in an embodiment. In an embodiment in which the OFDMA data unit 250 corresponds to a downlink OFDMA data unit, the OFDMA data unit 250 is generated by the AP 14 such that each OFDM data unit 252 is transmitted to a respective client station 25, via a respective sub-channel of the WLAN 10 allocated for downlink transmission of the OFDMA data unit 250 to the client station. Similarly, an embodiment in which the OFDMA data unit 250 corresponds to an uplink OFDMA data unit, the AP 14 receives the OFDM data units 252 via respective sub-channels of the WLAN 10 allocated for uplink transmission of the OFDM data units 252 from the client stations, in an embodiment. For example, the OFDM data unit 252-1 is transmitted via a first 20 MHZ sub-channel of the WLAN 10, the OFDM data unit 252-2 is transmitted via a second 20 MHz sub-channel of the WLAN 10, and the OFDM data unit 252-3 is transmitted via a 40 MHz sub-channel of the WLAN 10, in the illustrated embodiment.

In an embodiment, each of the OFDM data units 252 is formatted the same as or similar to the data unit 200 of FIG. 2A. In the embodiment of FIG. 2B, each of the OFDM data units 252-*i* includes a preamble, including one or more legacy short training fields (L-STF) 254, one or more legacy long training fields (L-LTF) 256, one or more legacy signal fields (L-SIG) 258, one or more first high efficiency WLAN signal field (HE-SIG-A) 260, Mi HE long training fields (HE-LTF) fields 264 and a second HE signal field (HE-SIGB) 266. Although in the embodiment illustrated in FIG. 2B, the data units 252-i includes different numbers Mi of HE-LTF fields 264, each of the data units 252-i includes the same number M of HE-LTF fields 264 to align the HE-SIGB fields 266 and the beginnings of the data portions 270 of the data unit 250, in some embodiments. For example, each of the data units 252-i includes a number M of HE-LTF fields 264 corresponding to a client station 25, of the multiple client stations 25, that utilizes the greatest number of spatial streams in the data unit 250, in an embodiment. In this embodiment, data units 252-i directed to client stations 25 that use fewer spatial streams, include one or more "padding" HE-LTF fields 264 to align the HE-LTF fields 264 with the data unit 252-i with the greatest number of spatial streams. For example, in an embodiment, padding HE-LTF fields 264 include repetitions of non-padding HE-LTF field(s) of the corresponding user, in an embodiment.

Additionally, each OFDM data unit 252 includes a high efficiency data portion (HE-DATA) portion 268. In an embodiment, padding is used in one or more of the OFDM data units 252 to equalize lengths of the OFDM data units 252. Accordingly, the length of each of the OFDM data units 252 correspond to the length of the OFDMA data unit 250, in this embodiment. Ensuring that the OFDM data units 252 are of equal lengths synchronizes transmission of acknowledgment frames by client stations 25 that receive the data units 252, in an embodiment. In an embodiment, each of one or more of the OFDM data units 252 is an aggregate MAC service data units (A-MPDU), which is in turn included in a PHY protocol data unit (PPDU). In an embodiment, padding (e.g., zero-padding) within one or more of the A-MPDUs 252 is used to equalize the lengths of the data units 252, and to synchronize transmission of acknowledgement frames corresponding to the OFDMA data unit 250. For example, each of the data units 252-2 and 252-3 includes padding portions 272 that equalize the respective lengths of the data units 252-2 and 252-3 with the length of the data unit 252-1, in the illustrated embodiment.

In an embodiment, the data portion 268 of each OFDM data unit 252 includes a padding portion 272. In an embodiment, the padding portion 272 includes the last OFDM symbol of the data portion 268 of the corresponding OFDM data unit 252. In another embodiment, the padding portion 272 includes more than one OFDM symbol at the end of the of the data portion 268 of the corresponding OFDM data unit 252. In some embodiments and/or scenarios, the data portions 268 of the data units 252 omit the padding portions 272.

In an embodiment, each data unit 252 further includes a signal extension (SE) field 274. In an embodiment, the SE field 274 provides buffer time for a receiving device (e.g., a client station 25 or the AP 14) to process the last OFDM symbol of the data portion 240 prior to providing an acknowledgement (ACK) or a block acknowledgement (BlkAck) signal to the transmitting device, as will be explained in more detail below. In some embodiments and/or scenarios, the data units 252 omit the SE fields 274.

In an embodiment, each L-LSF field 254, each L-LTF field 256, each L-SIG field 258 and each HE-SIGA field 260 occupies a smallest bandwidth supported by the WLAN 10 (e.g., 20 MHz). In an embodiment, if an OFDM data unit 252 occupies a bandwidth that is greater than the smallest bandwidth of the WLAN 10, then each L-LSF field 254, each L-LTF field 256, each L-SIG field 258, and each HE-SIGA field 260 is duplicated in each smallest bandwidth portion of the OFDM data unit 252 (e.g., in each 20 MHz portion of the data unit 252). On the other hand, each HE-STF field 262, each HE-LTF field 264, each HE-SIGB field 266, each HE data portion 268, and each SE field 274 occupies an entire bandwidth of the corresponding OFDM data unit 252, in an embodiment. For example, the OFDM data unit 252-3 occupies 40 MHz, wherein L-STF field 254, the L-LTF field 256, L-SIG field 258 and HE-SIGA field 260 is duplicated in the upper and the lower 20 MHz bands of the OFDM data unit 252-3, while each of the HE-STF field 262, the HE-LTF fields 264, the HE-SIGB field 266, the HE data portion 268 and the SE field 274 occupies the entire 40 MHz bandwidth of the data unit 252-3, in the illustrated embodiment.

In some embodiments, data for different client stations 25 is transmitted using respective sets of OFDM tones, within the data unit 250, wherein a set OFDM tones assigned to a client station 25 may correspond to a bandwidth that is smaller than the smallest channel of the WLAN 10. For example, a set of OFDM tones assigned to a client station 25 corresponds to a bandwidth that is smaller than 20 MHz (e.g., 5 MHz, 10 MHz, 15 MHz, or any other suitable bandwidth less than 20 MHz), in an embodiment. In an embodiment, if an OFDM data unit 252 occupies a bandwidth that is smaller than the smallest bandwidth of the WLAN 10, then each of the L-STF field 254, the L-LTF field 256, the L-SIG field 258 and the HE-SIGA field 260 nonetheless occupies the entire smallest bandwidth portion of the OFDM data unit 252 (e.g., in 20 MHz portion of the data unit 252). On the other hand, the HE-STF field 262, the HE-LTF field 264, the HE-SIGB field 266, the HE data portion 268 and the SE field 274 occupies the smaller bandwidth of the corresponding OFDM data unit 252, in an embodiment. Generally, a data unit 252 corresponds to any suitable number of OFDM tones within the data unit 250, in an embodiment.

A set of OFDM tones corresponding to a client station 25 is sometimes referred to herein as a "resource unit (RU)." In an embodiment, each OFDM data unit 252 corresponds to a client station 25 and to a resource unit assigned to the client station 25. In some implementations, an RU corresponding to a client station 25 includes a suitable number of OFDM tones or subcarriers within the data unit 250. For example, an RU includes 26, 52, 106, 242, 484, or 996 OFDM tones, in some embodiments and/or scenarios. In other embodiments, an RU includes other suitable numbers of OFDM tones.

In an embodiment, the first communication protocol utilizes the same channelization scheme as defined by a legacy communication protocol. For example, the first communication protocol utilizes the same channelization scheme as defined in the IEEE 802.11ac. In this embodiment, the first communication protocol operates with 20 MHz, 40 MHz, 80 MHz and 160 MHz communication channels. The 20 MHz, 40 MHz, 80 MHz and 160 MHz communication channels coincide, e.g., in center frequencies, with the channels utilized by a legacy communication protocol (e.g., the IEEE 802.11ac).

In an embodiment, however, the first communication protocol (e.g., the IEEE 802.11ax) defines a tone spacing that is different that the tone spacing defined by the legacy communication protocol (e.g., the IEEE 802.11 ac). For example, the first communication protocol defines a tone spacing that is a fraction I/N of the tone spacing defined by the legacy communication protocol, where N is a positive integer greater than one, in an embodiment. The integer N is an even integer (e.g., 2, 4, 6, 8, and 10), in an embodiment. The integer N is an integer that corresponds to a power of two (e.g., 2, 4, 8 and 16), in an embodiment. The reduced tone spacing is used in the first communication protocol to improve communication range compared to communication range supported or achieved by a legacy communication protocol, in an embodiment. Additionally or alternatively, the reduced tone spacing is used in the first communication protocol to increase throughput compared to throughput achieved in a same bandwidth channel by a legacy communication protocol.

Meanwhile, the reduced tone spacing used in the first communication protocol can result in increased size of the LTF and thus increased length of the LTF sequences. For example, if the HEW has a ¼ tone spacing of that of the VHT, the HE-LTF sequence length is roughly four times (4×) of the VHT-LTF. Similarly, if the HEW has a ½ tone spacing of that of the VHT, the HE-LTF sequence length is roughly 2× that of the VHT-LTF. As such, appropriate sequences for the longer HE-LTF sequences should be designed in view of this.

For example, in the cases of SU and MU MIMO with a ¼ tone spacing, several designs for the HE-LTF sequences (referred to as 4×HE-LTF) can be used. Option 1 is to take advantages of the corresponding VHT-LTF sequence with 4× bandwidth. For example, 20 MHz 4×HE-LTF can be designed by utilizing the 80 MHz VHT-LTF. In the cases that the 4×HE-LTF is longer than 80 MHz VHT-LTF, the values of LTF on the additional tones in 20 MHz 4×HE-LTF relative to the 80 MHz VHT-LTF can be obtained, for example, through exhaustive search to minimize PAPR.

Option 2 is to reuse the corresponding VHT-LTF sequence of the same bandwidth. For example, 20 MHz 4×HE-LTF can using 20 MHz VHT-LTF sequence as a base sequence. For example, the HE-LTF can be constructed as:

$$\text{HE-LTF}=[\text{VHT-LTF}; s0; \text{VHT-LTF}; s1; \text{VHT-LTF}; s2; \text{VHT-LTF}] \quad (7).$$

Here the 4×HE-LTF includes 4 copies of the 20 MHz VHT-LTF sequence with DC tone(s) replaced with +1 or −1 and additional three floating sequences s0, s1, and s2. Each of floating sequences s0, s1, and s2 can have a respective number of elements (e.g., binary values 1 or −1). The floating sequences s0, s1, and s2 may have the same or different numbers of elements. The total length of the floating sequences s0, s1, and s2 (i.e., the total number of elements in the floating sequences s0, s1 and s2) is the difference between the length of the 4×HE-LTF sequence and the total length of the base sequences (i.e., four 20 MHz VHT-LTF sequences). One example of the 4×HE-LTF sequence can be: [VHT-LTF(−26:−1) s VHT-LTF(1:26); s0(1:15); VHT-LTF(−26:−1) s VHT-LTF(1:26); 0 0 0; VHT-LTF(−26:−1) s VHT-LTF(1:26); s2(1:15); VHT-LTF(−26:−1) s VHT-LTF(1:26)], where s is the DC tone in original VHT-LTF sequence that is replaced with +1 or −1; s1=[0 0 0] covers all DC tones for 20 MHz 4×-LTF; and both s0 and s2 are sequences of length 15. As such, the total length of the floating sequences s0, s1, and s2 is significantly smaller than the size of the 4×HE-LTF, $L_{4\times HE-LTF}$. Accordingly, a significantly smaller number of variations of the floating sequences s0, s1, and s2 are possible, compared to $2^{L_{4\times H-LTF}}$ potential variations of a sequence of length $L_{4\times HE-LTF}$. For example, given the floating sequence s0 has a length of Ls0, then s0 can have $2^{Ls0}$ variations because each of its Ls0 element can take either 1 or −1 binary value.

In some implementations, the location of the floating sequences s0, s1, and s2 can be fixed, according to Equation (7), or in another manner. In some implementations, the locations of the floating sequences s0, s1, and s2 relative to each other and/or the four 20 MHz VHT-LTF sequences can change. For example, in some instances, unlike the floating sequences s0, s1, and s2 shown in Equation (7), two or three of the floating sequences may be next to each other, concatenating into one or two sequences. In some instances, the floating sequences s0, s1, and s2 can be separated by more than one 20 MHz VHT-LTF sequence.

In some implementations, by varying the locations and values (i.e., binary values of each sequence element) of the floating sequences s0, s1, and s2, all variations of the 4×HE-LTF sequence that include the four 20 MHz VHT-LTF sequences as the base sequences can be obtained. In some instances, the variations of the 4×HE-LTF sequence can be referred to as candidate sequences for the 4×HE-LTF sequence.

In some implementations, an optimal or sub-optimal 4×HE-LTF sequence can be determined through exhaustive search over all possible variations of the 4×HE-LTF sequences to identify the one, for example, having the lowest PAPR value or another desirable metric. In some instances, the identified optimal or sub-optimal sequence can be referred to as the target sequence. The DC tone value, the best values and locations of the floating sequences s0, s1, and s2 sequences can be determined based on the identified target sequence.

As noted above, even though an exhaustive search is involved, the lengths of the floating sequences s0, s1, and s2 are substantially smaller than the length of the 4×HE-LTF sequence, $L_{4\times HE-LTF}$. The possible variations of the floating sequences s0, s1 and s2 significantly smaller than $2^{L_{4\times HE-LTF}}$ potential variations of the 4×HE-LTF sequence. Moreover, the locations of the floating sequences s0, s1, and s2 are known or are fixed relative to the base sequences. As such, this exhaustive search by reusing the VHT-LTF sequences as the base sequence only needs to vary a small number of bits (e.g., 3 bits) at relative fixed or known locations. Accordingly, the computational complexity of the exhaustive search is significantly lower than a brute-force search over a search space of $2^{L_{4\times HB-LTF}}$ candidate sequences with the length $L_{4\times HE-LTF}$.

As another example, a portion of the 20 MHz VHT-LTF sequence can be used as the base sequence to construct the 4×HE-LTF sequence. As a specific example, Option 3 is to reuse the basic LTFleft and LTFright sequences of the 20 MHz VHT-LTF sequence. For example, 20 MHz 4×HE-LTF can be constructed by populating the [LTFleft; 1;LTFright] to every 64 tones:

$$\text{HE-LTF}=[\text{LTFleft};1;\text{LTFright}; s0; \text{LTFleft};1;\text{LTFright}; s1;\text{LTFleft};1;\text{LTFright}; s2;\text{LTFleft};1;\text{LTFright}] \quad (8).$$

Similarly, the best locations and values of the floating sequences s0, s1, and s2 for the target 4×HE-LTF sequence can be obtained through exhaustive search in a similar manner to the techniques discussed in connection with Option 2. In some implementations, additional variations can be constructed. For example, [LTFleft;−1;LTFright], [LTFright; 1; LTFleft] or [LTFright;−1;LTFleft] can replace one or more [LTFleft;1;LTFright] in Equation (8) to populate 64 tones. Other variations are possible as well for constructing different candidate 4×HE-LTF sequences.

Likewise, in the cases of SU and MU MIMO with a ½ tone spacing, several designs for the HE-LTF sequences (referred to as 2×HE-LTF) can be used. Option 1 is to take advantage of the corresponding VHT-LTF sequence with 2× bandwidth. For example, 20 MHz 2×HE-LTF can be designed by utilizing the 40 MHz VHT-LTF.

Option 2 is to reuse the corresponding VHT-LTF sequence of the same bandwidth. For example, the 20 MHz 2×HE-LTF sequence can be constructed using the 20 MHz VHT-LTF sequence as the base sequence with a floating sequence s0:

$$HE\text{-}LTF=[VHT\text{-}LTF; s0; VHT\text{-}LTF] \quad (9).$$

The VHT-LTF DC tone value and s0 sequence corresponding to the ultimate target 20 MHz 2×HE-LTF sequence can be obtained through exhaustive search as discussed above.

Similarly, Option 3 is to reuse the basic LTFleft and LTFright sequences of the 20 MHz VHT-LTF sequence as the base sequences. For example, 20 MHz 2×HE-LTF can be constructed by populating the [LTFleft;1;LTFright] to every 64 tones:

$$HE\text{-}LTF=[LTFleft;1;LTFright; s0; LTFleft;1;LTFright] \quad (10).$$

Similarly, additional candidate sequences can be constructed based on the basic LTFleft and LTFright sequences of the 20 MHz VHT-LTF sequence. The best values and location of the floating sequence s0 can be obtained through exhaustive search over the candidate sequences.

Moreover, as Option 4, the 2×HE-LTF sequence can be obtained by down-sampling the 4×HE-LTF sequence. Additional or different options are possible for designing the 2×HE-LTF sequence based on the VHT-LTF sequence.

In some implementations, compared with SU/MUMIMO WLAN, OFDMA-based WLAN may include unpopulated (i.e., unmodulated) tones for the transmission of training sequences. For example, for downlink (DL) OFDMA, some tones are left unpopulated, the HE-LTF sequence can be designed with such considerations. For example, one option (referred to as Option 1) is to use the same HE-LTF sequence as SU/MUMIMO. The LTF sequence still transmits on the unpopulated tones. In some other implementations, another option (referred to as Option 2) is to mask the unpopulated tones in the full band from which the HE-LTF sequence is designed for SU/MUMIMO. For example, in an SU case, the unpopulated tones over the bandwidth (e.g., 20 MHz) assigned to the SU can be identified (e.g., according to the communications protocol or other specifications). The HE-LTF sequence designed for the SU with its assigned bandwidth can be used to modulate the tones/subcarriers, followed by masking (i.e., muting) the unpopulated tones (i.e., transmitting null tones in the locations of the unpopulated tones).

For uplink (UL) OFDMA, each user is transmitting only on its RUs, without occupying the entire bandwidth. The HE-LTF for a user's RUs can be obtained, for example, by masking the full band OFDMA HE-LTF sequence with the used tones of the RUs. Alternatively, the HE-LTF sequence for the smallest RU (26 tones) can be designed and referred to as 26-tone RU LTF sequence, for example, through exhaustive search. And the HE-LTF sequences for other RU sizes can be constructed based on 26-tone RU LTF sequence. For example, the HE-LTF sequences for other RU sizes can be constructed by using the 26-tone RU LTF sequence as the base sequence and following the techniques described above in connection with designing SU/MU MIMO HE-LTF sequences.

As a specific example, for SU/MUMIMO transmission mode, a respective optimal or suboptimal sequence (collectively "a target sequence") for 4×-HE-LTF for a respective bandwidth (e.g., 20 MHz, 40 MHz, and 80 MHz) can be designed based on the LTFleft and LTFright sequences of the VHT-LTF sequence:

$$LTFleft: L1=[1,1,-1,-1,1,1,-1,1,-1,1,1,1,1,1,1,-1,-1, 1,1,-1,1,-1,1,1,1,1] \quad (11);$$

$$LTFright: L2=[1,-1,-1,1,1,-1,1,-1,1,-1,-1,-1,-1,-1, 1,1,-1,-1,1,-1,1,-1,1,1,1,1] \quad (12);$$

For example, the target 20 MHz 4×HE-LTF sequence can be:

$$HE\text{-}LTF_{20\ MHz}=[S_1,0,0,0,S_2] \quad (13),$$

where $$S1=[1, L1, -L2, 1, -L1, -L2, -L1(1:13), 1, 1] \quad (14);$$

$$S2=[1, 1, -L1(14:26), -L1, L2, 1, -L1, -L2, 1] \quad (15).$$

Note that, there, the S1 reuses a left half of the LTFleft sequence L1, while the S2 sequence reuses a right half of the LTFleft sequence L2.

The target 40 MHz 4×HE-LTF sequence can be:

$$LTF_{40\ MHz}=[S_1, -S_2, 0, 0, 0, 0, 0, -S_1, -S_2] \quad (16);$$

The target 80 MHz 4× sequence can be:

$$LTF_{80\ MHz}=[-S_1, S_2, S_1, S_2, L1(1:13),1, 0, 0, 0, 0, 0, 1, -L1(14:26), S_1, -S_2, S_1, S_2] \quad (17).$$

Figure 3A:
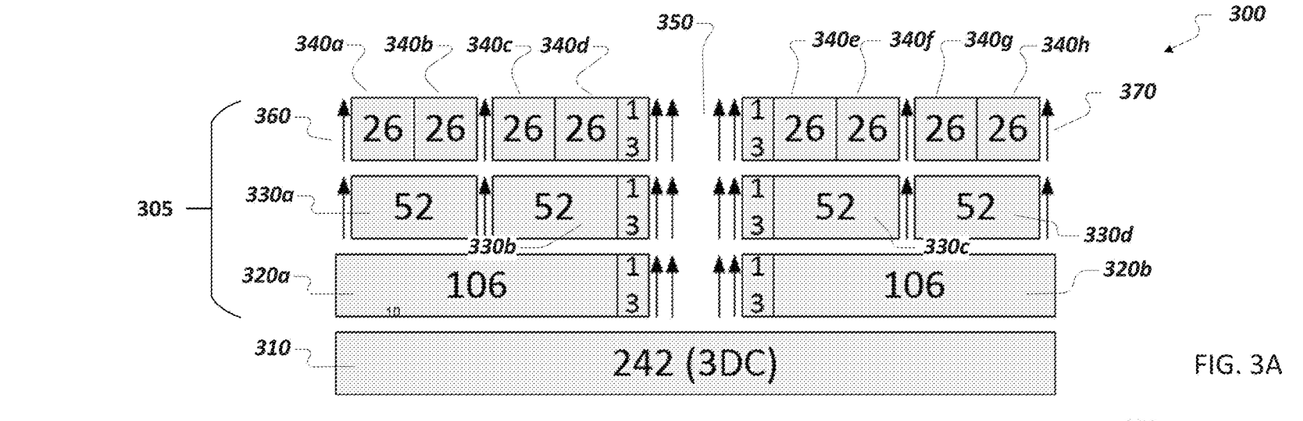
FIG. 3A is a diagram showing examples of long training field (LTF) sequences for transmission over a 20 MHz channel of a High Efficiency (HE) WLAN communication system.

FIG. 3A is a diagram 300 showing examples of 4×-HE-LTF sequences for transmission over a 20 MHz channel of a HEW communication system. Block 310 represents the 4×-HE-LTF sequence for SU/MU MIMO case, where the 4×-HE-LTF sequence spans the entire bandwidth of 242 tones/subcarriers with 3 DC tones. The 4×-HE-LTF sequence 310 can be, for example, the 20 MHz 4×-HE-LTF sequence given in Equation (13).

The top 3 rows of blocks show 4×-HE-LTF sequences for the OFDMA case 305. Specifically, the top row includes eight RUs 340a, 340b, 340c, 340d, 340e, 340f, 340g, and 340h. Each of the RUs 340a-h includes 26 tones, which is the smallest RU size. The $2^{nd}$ row includes 4 RUs 330a, 330b, 330c, and 330d, each of the RUs 330a-d includes 52 tones. The $3^{rd}$ row includes 2 RUs 320a and 320b, each of the RUs 320a and 320b includes 106 tones. As illustrated, in the OFDMA mode, there are multiple unpopulated tones 350, 360 and 370 in the middle and edges of the bandwidth. These 4×-HE-LTF sequences for the OFDMA cases can be designed according to the example techniques described above, for example, by first designing the optimal sequence for the smallest RUs 340a and then reusing the optimal sequence for the smallest RUs 340a to obtain the optimal or suboptimal 4×-HE-LTF sequences for bigger RUs 340a and RUs 320a and 320b. As described above, the unpopulated tones can be masked, for example, after determining the 4×-HE-LTF sequence for use in the particular OFDMA case.

Figure 3B:
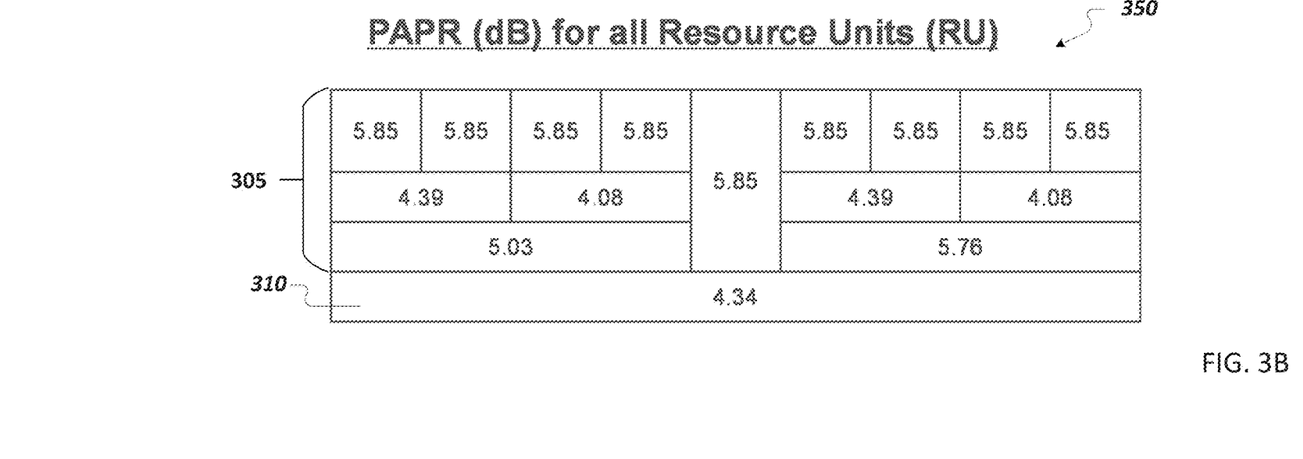
FIG. 3B is a diagram showing corresponding peak-to-average power ratio (PAPR) values of the LTF sequences in FIG. 3A.

FIG. 3B is a diagram 350 showing corresponding peak-to-average power ratio (PAPR) values of the 4×-HE-LTF sequences used in FIG. 3A. As illustrated, the more RUs are divided among the full bandwidth, the higher PAPR results. The 4×-HE-LTF sequence for SU/MU MIMO case where the 4×-HE-LTF sequence spans the entire bandwidth of 242 tones/subcarriers with 3 DC tones gives the smallest PAPR of 4.34.

Figure 4A:
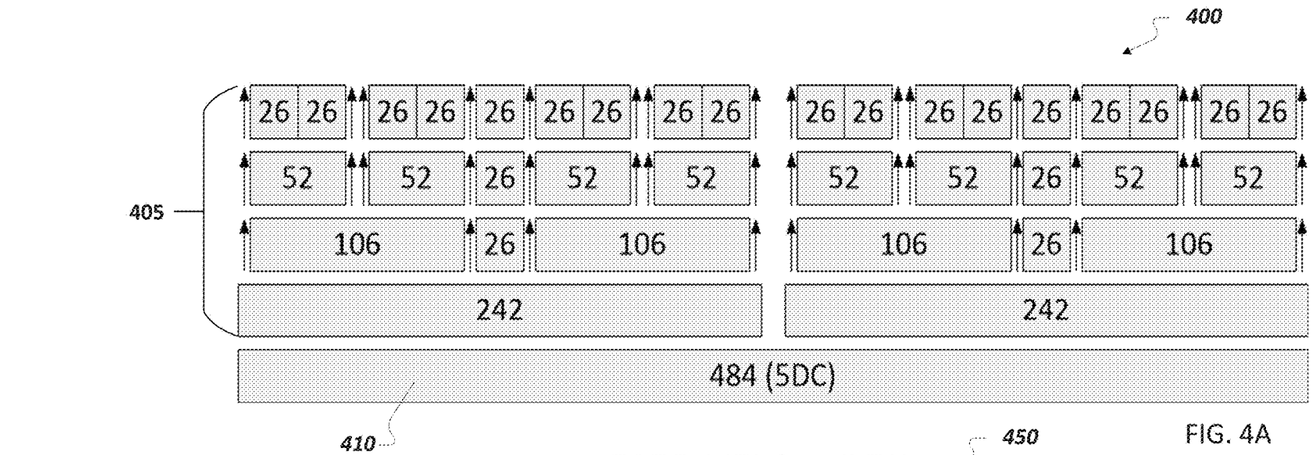
FIG. 4A is a diagram showing examples of LTF sequences for transmission over a 40 MHz channel of a HE WLAN communication system.
Figure 4B:
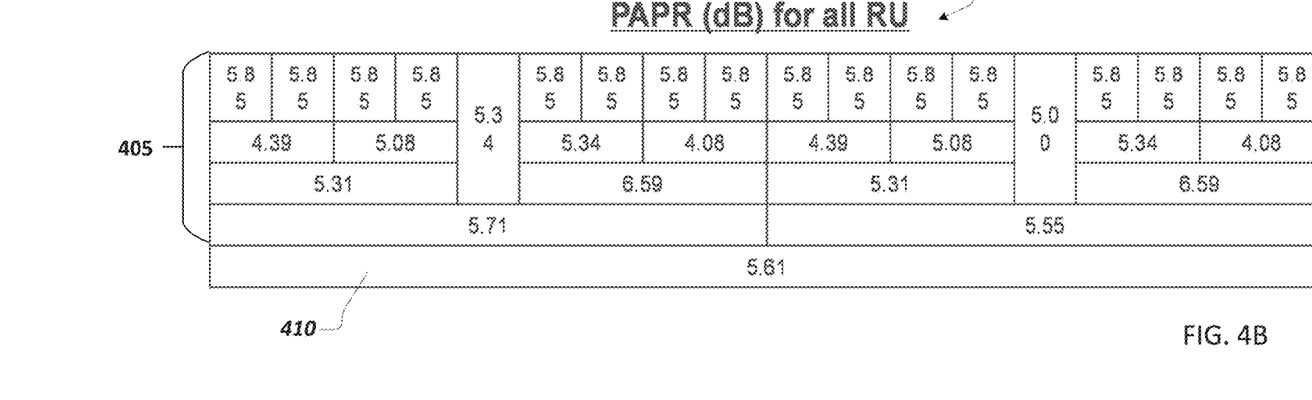
FIG. 4B is a diagram showing corresponding PAPR values of the LTF sequences in FIG. 4A.

Similarly, FIG. 4A is a diagram 400 showing examples of 4×-HE-LTF sequences for transmission over a 40 MHz channel of a HEW communication system. Block 410 represents the 4×-HE-LTF sequence for SU/MU MIMO case for the 40 MHz channel where the 4×-HE-LTF sequence spans the entire bandwidth of 484 tones/subcarriers with 5 DC tones. The 4×-HE-LTF sequence 410 can be, for example, the 40 MHz 4×-HE-LTF sequence given in Equation (16). The OFDMA cases are presented by the top 4 row of blocks 405. FIG. 4B is a diagram 450 showing corresponding PAPR values of the 4×-HE-LTF sequences used in FIG. 4A.

Figure 5A:
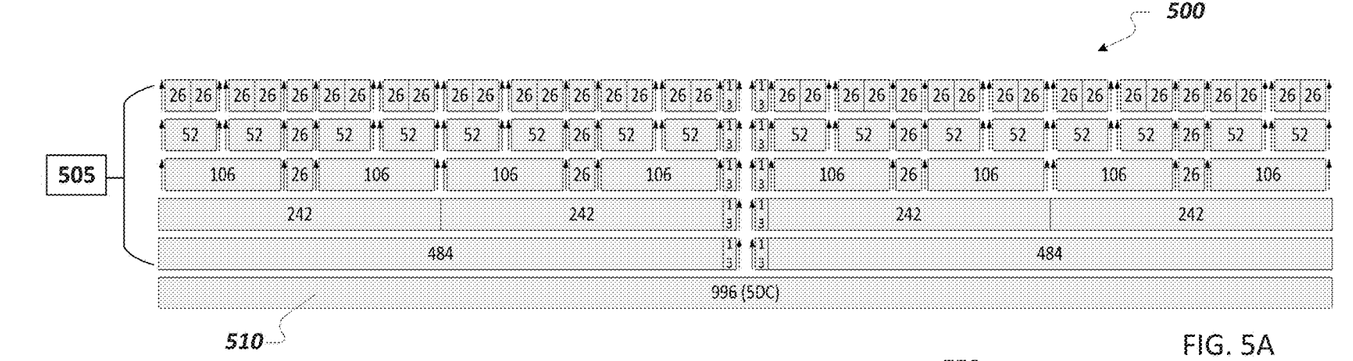
FIG. 5A is a diagram showing examples of LTF sequences for transmission over a 80 MHz channel of a HE WLAN communication system.
Figure 5B:
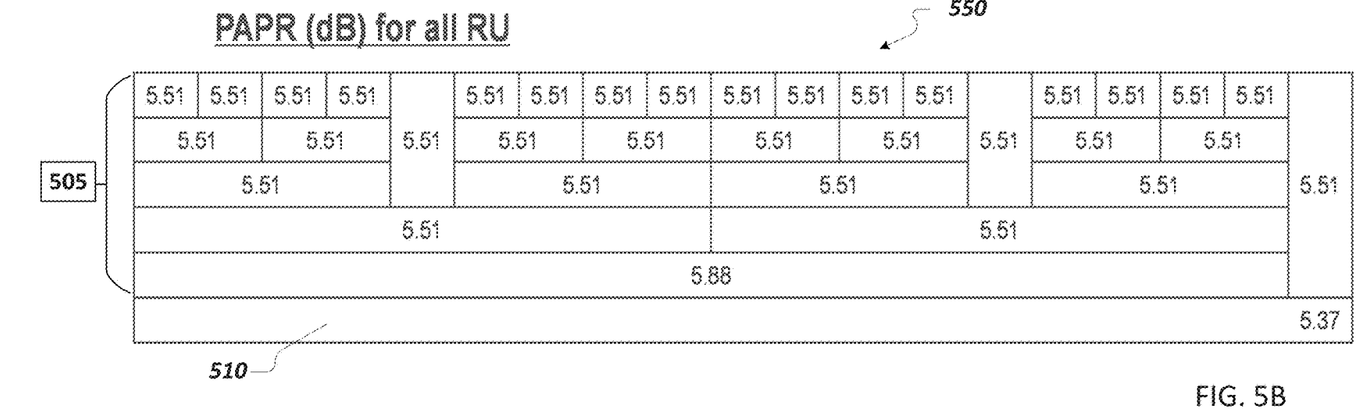
FIG. 5B is a diagram showing corresponding PAPR values of the LTF sequences in FIG. 5A.

FIG. 5A is a diagram 500 showing examples of 4×-HE-LTF sequences for transmission over a 80 MHz channel of a HEW communication system. Block 510 represents the 4×-HE-LTF sequence for SU/MU MIMO case for the 80 MHz channel where the 4×-HE-LTF sequence spans the entire bandwidth of 996 tones/subcarriers with 5 DC tones. The 4×-HE-LTF sequence 510 can be, for example, the 80 MHz 4×-HE-LTF sequence given in Equation (17). The OFDMA cases are presented by the top 5 rows of blocks 505. FIG. 5B is a diagram 550 showing corresponding PAPR values of the 4×-HE-LTF sequences used in FIG. 5A.

Figure 6:
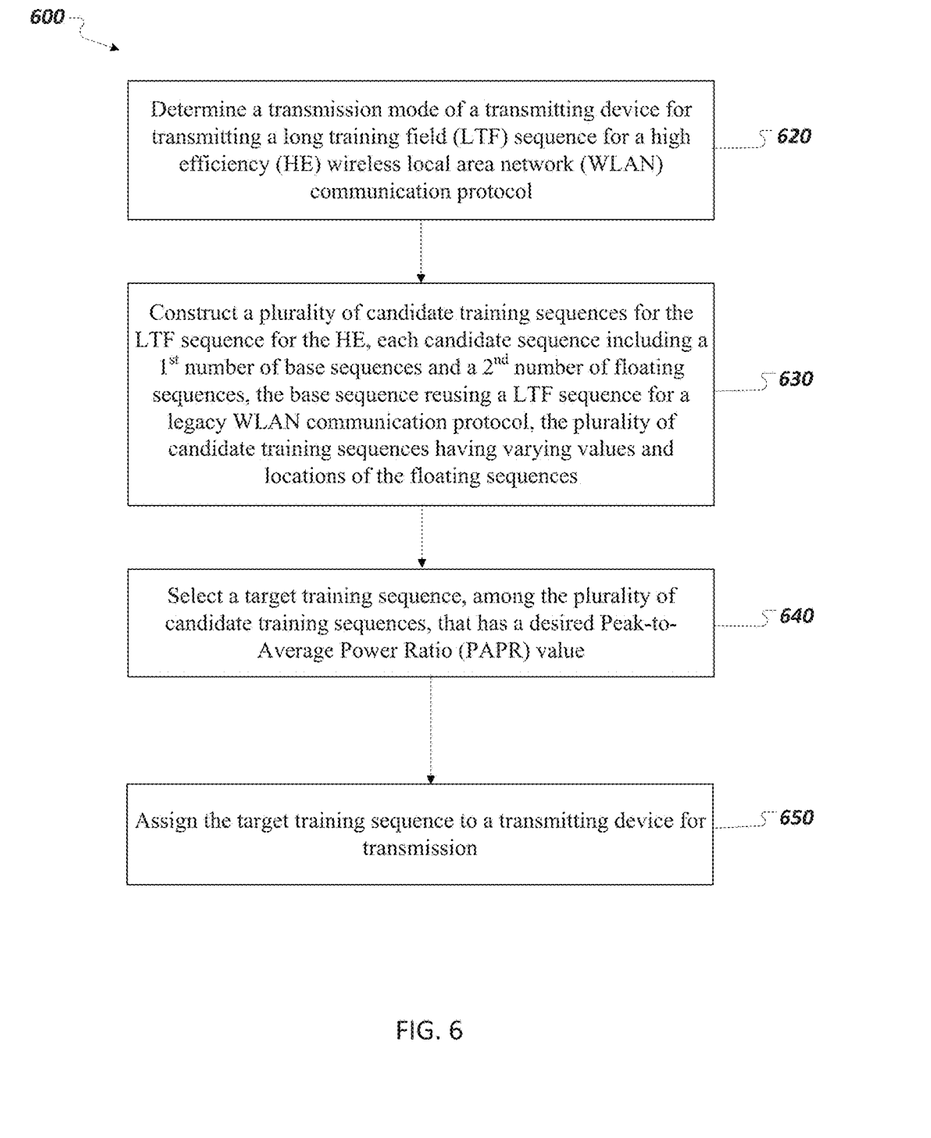
FIG. 6 is a flowchart showing a process of designing a training sequence for transmission in a wireless communication system, according to an embodiment.

FIG. 6 is a flowchart showing a process 600 of designing a training sequence (e.g., a HE-LTF sequence) for a wireless communication system (e.g., a HEW system), according to an embodiment. This process can be implemented by data processing apparatus. For example, the data processing apparatus can be a wireless communication device such as the access point 14 or a client station 25 in the system 10, or can be a computing device such as a computer regardless whether the computer is a part of the system 10. For example, the computing device can be a part of a central control station, a computation center, or a cloud that can precompute, store, transfer, and assign the computed training sequence to another device for transmission in a wireless communication system.

At 620, a transmission mode of a transmitting device for transmitting a long training field (LTF) sequence for High Efficiency (HE) wireless local area network (WLAN) communication is determined. The transmitting device can be, for example, the access point 14 or a client station 25 in the system 10, or another communication device. The transmission mode can include, for example, a transmission bandwidth (e.g., 20 MHz, 40 MHz, 80 MHz, and 160 MHz), a transmission direction (e.g., uplink or downlink), a tone spacing (e.g., ¼ or ½ relative to the VHT WLAN), a single user (SU) multiple input multiple output (MIMO) mode, a multiple user (MU) MIMO mode, an orthogonal frequency division multiple access (OFDMA) mode or other transmission parameters for the transmission device.

At 630, a plurality of candidate training sequences for the LTF sequence are constructed for the HE WLAN communication based on the transmission mode. Each candidate sequence includes a first number of base sequences and a second number of floating sequences. In some implementations, the base sequences reuse an LTF sequence for a legacy WLAN communication protocol (e.g., Very High Throughput (VHT) communication protocol, IEEE 802.11ac). In this case, the LTF sequence for the VHT is referred to as a VHT-LTF sequence. In some other implementations, the LTF sequence for another legacy communication protocol may be used.

In some implementations, reusing the VHT-LTF sequence includes reusing a portion or an entirety of a VHT-LTF sequence designed for a particular transmission bandwidth. For example, the base sequence can reuse the entire VHT-LTF sequence for a transmission bandwidth of 20 MHz (referred to as a 20 MHz VHT-LTF sequence), a left sequence of the 20 MHz VHT-LTF sequence (e.g., LTFleft given in Equation (1) or (11)), or a right sequence of the 20 MHz VHT-LTF sequence (e.g., LTFright given in Equation (2) or (12)). In some implementations, a portion of the left sequence or the right sequence of VHT-LTF sequence can be used. As such, the candidate sequence can be constructed to include one or more such base sequences, for example, similar to Equations (9) and (10) or in a different manner.

In some implementations, the first number of base sequences and the second number of floating sequences are determined based on the transmission bandwidth and the tone spacing of the transmission device. More specifically, a size of the HE-LTF and thus the length of the HE-LTF sequence can be determined based on the transmission bandwidth, the tone spacing, and a SU/MU MIMO or OFDMA mode of the transmission device. For example, FIG. 3A shows the length of the HE-LTF sequence is 242 tones/subcarriers for a 20 MHz transmission bandwidth, a ¼ tone spacing and a SU/MU MIMO transmission mode. For an OFDMA mode, FIG. 3A shows the HE-LTF sequence is transmitted in terms of RUs. The length of the HE-LTF sequence depends on the size of RUs used by the transmitting device. FIG. 3A shows the sizes of RU can be 26, 52, and 106 for the 20 MHz transmission bandwidth with a ¼ tone spacing case.

In some implementations, if the transmission bandwidth is 20 MHz and the tone spacing is ¼, the first number of base sequences can be determined to be 4 when the base sequence is the VHT-LTF sequence for 20 MHz bandwidth; the first number of base sequences can be determined to be 2 when the base sequence is the VHT-LTF sequence for 40 MHz bandwidth. The second number of floating sequences is determined based on the length of the HE-LTF sequence and the total length of the first number of base sequences.

In some implementations, constructing the plurality of candidate training sequences includes constructing the plurality of candidate training sequences by varying values and locations of the second number of floating sequences, for example, according to the techniques described above in connection with various design options for the 4×HE-LTF and 2×HE-LTF sequences based on the VHT-LTF sequence. For example, constructing the plurality of candidate training sequences by varying values and locations of the second number of floating sequences can include performing an exhaustive search of all variations in the values and the locations of the second number of floating sequences without varying the first number of base sequences. Such an exhaustive search has a significantly smaller search space and thus lower computational complexity than a typical exhaustive search performed over all variations of sequences having a length of the HE-LTF sequence.

In some implementations, if the transmission mode is OFDMA mode, a smallest RU for the OFDMA mode can be determined. A target resource unit (RU) sequence can be determined for the smallest RU for the OFDMA mode. The target RU sequence can have a desired PAPR value or other property. Constructing the plurality of candidate training sequences for the LTF sequence for the HE WLAN communication includes reusing the target RU sequence for the smallest RU for the OFDMA mode.

At 640, a target training sequence is selected from the plurality of candidate training sequences for the HE-LTF sequence. The target training sequence can be an optimal or a suboptimal sequence that has a desired peak-to-average power ratio (PAPR) value or other desired properties (e.g., zero cross correlation or a delta-function of autocorrelation). In some implementations, the target training sequence is selected by computing the PAPR value of each of the plurality of candidate training sequences for the HE-LTF sequence and choosing the sequence that has the minimum PAPR value.

In some implementations, the reuse of the VHT-LTF sequence for the HE-LTF sequence can help significantly reduce the computational complexity in searching for the target sequence, by reducing the search space, for example, as described above in connection with Equation (7). As such, the target training sequence can be efficiently selected.

At 650, the target training sequence is assigned to the transmitting device for transmitting the target training sequence in the LTF for the HE WLAN communication according to the determined transmission mode.

Figure 7:
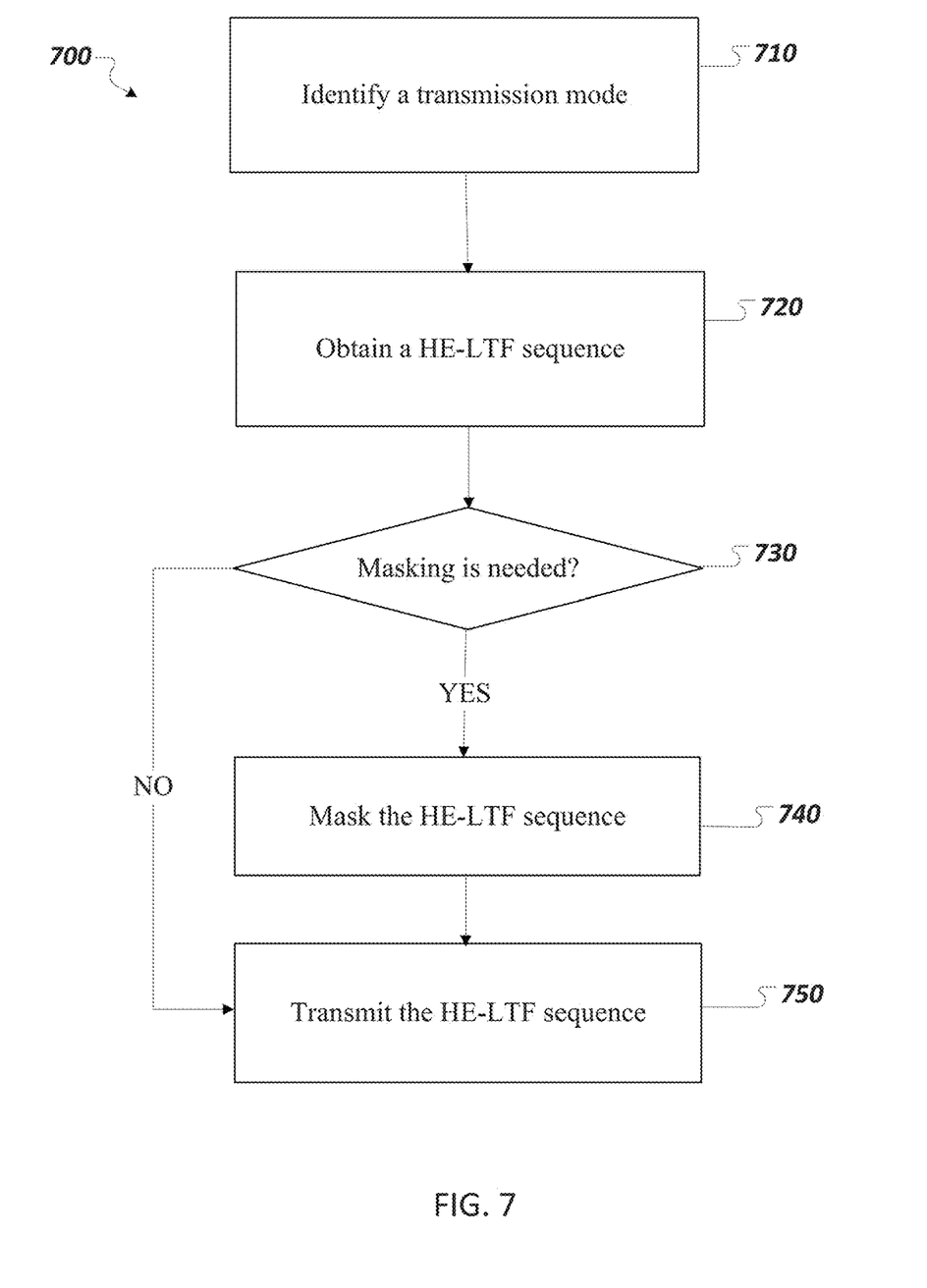
FIG. 7 is a flowchart showing a process of transmitting a training sequence in a wireless communication system, according to an embodiment.

FIG. 7 is a flowchart showing a process 700 of transmitting a training sequence (e.g., a HE-LTF sequence) by a transmitting device in a wireless communication system (e.g., a HEW system), according to an embodiment. The transmitting device can be a wireless communication device such as the access point 14 or a client station 25 in the system 10, or another device. In some implementations, the processes 600 and 700 can be performed by the same device, such that the process 700 is performed following the process 600. In some implementations, the process 700 is performed independently from the process 600, for example, by a device different from the device performs the process 600.

At 710, a transmission mode of the transmitting device is identified, for example, by a processing unit of the transmitting device (e.g., the PHY processing unit 20 of the access point 14 or the PHY processing unit 29 of the client device 25-1). The transmission mode is for transmitting a long training field (LTF) sequence for High Efficiency (HE) wireless local area network (WLAN) communication. The transmission mode can include, for example, a transmission bandwidth (e.g., 20 MHz, 40 MHz, 80 MHz, and 160 MHz), a transmission direction (e.g., uplink or downlink), a tone spacing (e.g., ¼ or ½ relative to the VHT WLAN), a single user (SU) multiple input multiple output (MIMO) mode, a multiple user (MU) MIMO mode, an orthogonal frequency division multiple access (OFDMA) mode or other transmission parameters for the transmission device.

At 720, a HE-LTF sequence is obtained by the transmitting device. The HE-LTF sequence can be obtained, for example, by receiving from a computing device over a communication interface, or by retrieving it from a data storage of the transmitting device or an external device.

The HE-LTF sequence can be the target training sequence selected at 640 of FIG. 6. The target sequence includes a first number of base sequences and a second number of floating sequences. The first number of base sequences and the second number of floating sequences have been determined based on the transmission mode. The base sequences reuse an LTF sequence for Very High Throughput (VHT) WLAN communication, and values and locations of the floating sequences have been determined such that the target sequence has a desired peak-to-average power ratio (PAPR) value.

At 730, whether a masking is needed can be determined by the transmitting device. In some implementations, such a determination can be based on the transmission mode of the transmitting device. For example, if the transmission mode is an OFDMA mode in the DL direction, in response to such a determination, the HE-LTF sequence can be masked at 740 by muting specified tones of the HE-LTF sequence. The specified tones can be the unpopulated tones such as the null tones 350, 360 and 370 shown in FIG. 3A. The unpopulated tones may be specified by the communication protocol or some other specification(s). At 750, the masked HE-LTF sequence is transmitted, for example, in the HE-LTF field of the PHY data unit by the transmitting device (e.g., the transmitter 21 of the access point 14) according to the transmission mode of the transmitting device.

In some implementations, it can be determined that masking is not needed. Then at 750, the unmasked HE-LTF sequence is transmitted, for example, in the HE-LTF field of the PHY data unit by a transmitter of the transmitting device (e.g., the transmitter 21 of the access point 14 or the transmitter 30 of the client station 25-1) according to the transmission mode of the transmitting device.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification, in the context of separate embodiments, can also be implemented in combination, in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
    determining a transmission mode of a transmitting device for transmitting a long training field (LTF) sequence for High Efficiency (HE) wireless local area network (WLAN) communication, wherein the transmission mode comprises an orthogonal frequency division multiple access (OFDMA) mode;
    based on the transmission mode, constructing a plurality of candidate training sequences for the LTF sequence for the HE WLAN communication, wherein each candidate sequence includes a first number of base sequences and a second number of floating sequences, wherein the base sequences reuse an LTF sequence for Very High Throughput (VHT) WLAN communication, and wherein constructing the plurality of candidate training sequences includes constructing the plurality of candidate training sequences by varying values and locations of the second number of floating sequences;
    selecting a target training sequence, from the plurality of candidate training sequences for the LTF sequence for the HE WLAN communication, that has a desired peak-to-average power ratio (PAPR) value;
    in response to determining that the transmission mode is an OFDMA mode, masking the target training sequence by muting specified tones of the target training sequence; and
    assigning the masked target training sequence to the transmitting device for transmitting the masked target training sequence in the LTF for the HE WLAN communication.

2. The method of claim 1, wherein determining a transmission mode includes determining one or more of a transmission bandwidth, a transmission direction, or a tone spacing.

3. The method of claim 2, wherein the first number of base sequences and the second number of floating sequences are determined based on the transmission bandwidth and the tone spacing.

4. The method of claim 1, further comprising transmitting, by the transmitting device, the target training sequence in the LTF for the HE WLAN communication.

5. The method of claim 1, wherein the base sequences reuse an LTF sequence for VHT WLAN communication with a transmission bandwidth of 20 MHz, a left sequence of the LTF sequence for VHT WLAN communication with a transmission bandwidth of 20 MHz, or a right sequence of the LTF sequence for VHT WLAN communication with a transmission bandwidth of 20 MHz.

6. The method of claim 1, further comprising:
    in response to determining that the transmission mode is the OFDMA mode, determining a target resource unit (RU) sequence for a smallest RU for the OFDMA mode, the target RU sequence for the smallest RU for the OFDMA mode having a desired PAPR value; and
    wherein constructing the plurality of candidate training sequences for the LTF sequence for the HE WLAN communication includes reusing the target RU sequence for the smallest RU for the OFDMA mode.

7. The method of claim 1, wherein constructing the plurality of candidate training sequences by varying values and locations of the second number of floating sequences comprises performing an exhaustive search of all variations in the values and the locations of the second number of floating sequences without varying the first number of base sequences.

8. A device including:
    a processing unit configured to:
        identify a transmission mode of the device for transmitting a long training field (LTF) sequence for High Efficiency (HE) wireless local area network (WLAN) communication, wherein the transmission mode comprises an orthogonal frequency division multiple access (OFDMA) mode;
        obtain a target training sequence for the LTF sequence for the HE WLAN communication, the target training sequence including a first number of base sequences and a second number of floating sequences, the first number of base sequences and the second number of floating sequences have been determined based on the transmission mode, the base sequences reusing an LTF sequence for Very High Throughput (VHT) WLAN communication, and values and locations of the floating sequences have been determined such that the target training sequence has a desired peak-to-average power ratio (PAPR) value; and
        in response to determining that the transmission mode is an OFDMA mode, mask the target training sequence by muting specified tones of the target training sequence; and
    transmitter configured to transmit the masked target training sequence in the LTF for the HE WLAN communication according to the transmission mode.

9. The device of claim 8, wherein the target training sequence has been selected from a plurality of candidate training sequences for the LTF sequence for the HE WLAN communication based on the transmission mode, the plurality of candidate training sequences including varied values and locations of the floating sequences.

10. The device of claim 8, wherein the identified transmission mode includes one or more of a transmission bandwidth, a transmission direction, or a tone spacing.

11. The device of claim 8, wherein the reused LTF sequence for VHT WLAN communication includes one or more of an LTF sequence for VHT WLAN communication with a transmission bandwidth of 20 MHz, a left sequence of the LTF sequence for VHT WLAN communication with a transmission bandwidth of 20 MHz, or a right sequence of the LTF sequence for VHT WLAN communication with a transmission bandwidth of 20 MHz.

12. A method comprising:
    determining a transmission mode of a transmitting device for transmitting a long training field (LTF) sequence for High Efficiency (HE) wireless local area network (WLAN) communication, wherein the transmission mode comprises an orthogonal frequency division multiple access (OFDMA) mode;
    based on the transmission mode, constructing a plurality of candidate training sequences for the LTF sequence for the HE WLAN communication, wherein each candidate sequence includes a first number of base sequences and a second number of floating sequences, wherein the base sequences reuse an LTF sequence for Very High Throughput (VHT) WLAN communication, and wherein constructing the plurality of candidate training sequences includes constructing the plurality of candidate training sequences by varying values and locations of the second number of floating sequences;

in response to determining that the transmission mode is the OFDMA mode, determining a target resource unit (RU) sequence for a smallest RU for the OFDMA mode, the target RU sequence for the smallest RU for the OFDMA mode having a desired peak-to-average power ratio (PAPR) value, wherein constructing the plurality of candidate training sequences for the LTF sequence for the HE WLAN communication includes reusing the target RU sequence for the smallest RU for the OFDMA mode;

selecting a target training sequence, from the plurality of candidate training sequences for the LTF sequence for the HE WLAN communication, that has a desired peak-to-average power ratio (PAPR) value; and assigning the target training sequence to the transmitting device for transmitting the target training sequence in the LTF for the HE WLAN communication.

13. The method of claim 12, wherein determining a transmission mode includes determining one or more of a transmission bandwidth, a transmission direction, or a tone spacing.

14. The method of claim 13, wherein the first number of base sequences and the second number of floating sequences are determined based on the transmission bandwidth and the tone spacing.

15. The method of claim 13, further comprising:
in response to determining that the transmission mode is an OFDMA mode, masking the target training sequence by muting specified tones of the target training sequence.

16. The method of claim 12, further comprising transmitting, by the transmitting device, the target training sequence in the LTF for the HE WLAN communication.

17. The method of claim 12, wherein the base sequences reuse an LTF sequence for VHT WLAN communication with a transmission bandwidth of 20 MHz, a left sequence of the LTF sequence for VHT WLAN communication with a transmission bandwidth of 20 MHz, or a right sequence of the LTF sequence for VHT WLAN communication with a transmission bandwidth of 20 MHz.

18. The method of claim 12, wherein constructing the plurality of candidate training sequences by varying values and locations of the second number of floating sequences comprises performing an exhaustive search of all variations in the values and the locations of the second number of floating sequences without varying the first number of base sequences.

19. A device including:
a processing unit configured to:
identify a transmission mode of the device for transmitting a long training field (LTF) sequence for High Efficiency (HE) wireless local area network (WLAN) communication; wherein the transmission mode comprises an orthogonal frequency division multiple access (OFDMA) mode;

obtain a target training sequence for the LTF sequence for the HE WLAN communication, the target training sequence including a first number of base sequences and a second number of floating sequences, the first number of base sequences and the second number of floating sequences have been determined based on the transmission mode, the base sequences reusing an LTF sequence for Very High Throughput (VHT) WLAN communication, and values and locations of the floating sequences have been determined such that the target training sequence has a desired peak-to-average power ratio (PAPR) value, wherein the target training sequence reuses a target resource unit (RU) sequence for a smallest RU for the OFDMA mode, the target RU sequence for the smallest RU for the OFDMA mode having the desired PAPR value; and in response to determining that the transmission mode is an OFDMA mode, mask the target sequence by muting specified tones of the target training sequence; and a transmitter configured to transmit the masked target training sequence in the LTF for the HE WLAN communication according to the transmission mode.

20. The device of claim 19, wherein the target training sequence has been selected from a plurality of candidate training sequences for the LTF sequence for the HE WLAN communication based on the transmission mode, the plurality of candidate training sequences including varied values and locations of the floating sequences.

21. The device of claim 19, wherein the identified transmission mode includes one or more of a transmission bandwidth, a transmission direction, or a tone spacing.

* * * * *